US011438133B2

(12) United States Patent
Chen et al.

(10) Patent No.: US 11,438,133 B2
(45) Date of Patent: Sep. 6, 2022

(54) DATA SYNCHRONIZATION IN A P2P NETWORK

(71) Applicant: Huawei Technologies Co., Ltd., Shenzhen (CN)

(72) Inventors: Jianjun Chen, Cupertino, CA (US); Chunfeng Pei, San Jose, CA (US); Ye Liu, Foster City, CA (US); Marko Dimitrijevic, San Jose, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/446,779

(22) Filed: Sep. 2, 2021

(65) Prior Publication Data

US 2021/0399868 A1 Dec. 23, 2021

Related U.S. Application Data

(63) Continuation of application No. PCT/CN2020/077906, filed on Mar. 5, 2020.
(Continued)

(51) Int. Cl.
*G06F 15/16* (2006.01)
*H04L 7/00* (2006.01)
(Continued)

(52) U.S. Cl.
CPC ........ *H04L 7/0016* (2013.01); *H04L 41/0813* (2013.01); *H04L 67/104* (2013.01)

(58) Field of Classification Search
CPC .......................... H04L 41/0813; H04L 67/104
(Continued)

(56) References Cited

U.S. PATENT DOCUMENTS 10,225,338 B1 3/2019 Chu et al.
2004/0153473 A1* 8/2004 Hutchinson ............. G06F 16/27
(Continued)

FOREIGN PATENT DOCUMENTS

CN 103378993 A 10/2013
CN 106162856 A 11/2016
(Continued)

OTHER PUBLICATIONS

"European Application No. 20765891.5, European Search Report dated Feb. 25, 2022", (dated Feb. 25, 2022), 8 pgs.
(Continued)

*Primary Examiner* — Hee Soo Kim
(74) *Attorney, Agent, or Firm* — Schwegman Lundberg & Woessner, P.A.

(57) ABSTRACT

A computer-implemented method for data synchronization in a P2P ad hoc network includes retrieving network configuration information identifying a plurality of devices forming the P2P ad hoc network. A time offset between a local physical time at a first device and a local physical time of a second device is determined. A change in a data object of a plurality of data objects stored at a key-value store within the first device is detected, each of the data objects including a synchronization indicator. The data object change is communicated to at least the second device based on the synchronization indicator. Upon receiving confirmation from the at least the second device of receipt of the data object change, the network configuration information is updated with a timestamp based on the time offset and indicative of the local physical time at the first device when the data object change was communicated.

20 Claims, 11 Drawing Sheets

Related U.S. Application Data

(60) Provisional application No. 62/814,554, filed on Mar. 6, 2019.

(51) Int. Cl.
    *H04L 41/0813*     (2022.01)
    *H04L 67/104*     (2022.01)

(58) Field of Classification Search
    USPC .......................................................... 709/248
    See application file for complete search history.

(56) References Cited

U.S. PATENT DOCUMENTS

| | | | |
|---|---|---|---|
| 2005/0262166 A1* | 11/2005 | Rajeev | G06F 16/275 |
| 2008/0240073 A1* | 10/2008 | Pun | H04W 56/0015 |
| | | | 370/350 |
| 2009/0172201 A1* | 7/2009 | Carmel | H04L 67/1068 |
| | | | 709/248 |
| 2013/0166505 A1 | 6/2013 | Peretz et al. | |
| 2013/0297563 A1* | 11/2013 | Kim | G06Q 10/10 |
| | | | 707/618 |
| 2014/0029603 A1* | 1/2014 | Nomura | H04W 56/0015 |
| | | | 370/350 |
| 2014/0280605 A1 | 9/2014 | Zhang | |
| 2016/0170439 A1* | 6/2016 | Aweya | H04L 69/28 |
| | | | 713/401 |
| 2016/0182494 A1 | 6/2016 | Lissounov et al. | |
| 2020/0145483 A1* | 5/2020 | Pucha | H04W 4/80 |
| 2021/0218489 A1* | 7/2021 | Xu | H04J 3/0667 |

FOREIGN PATENT DOCUMENTS

| | | | | |
|---|---|---|---|---|
| EP | 1594071 A2 * | 11/2005 | ....... | G06F 17/30581 |
| EP | 1976165 A2 * | 10/2008 | ........ | H04W 56/0015 |
| EP | 2660761 A1 * | 11/2013 | ............. | G06F 16/27 |
| EP | 2660761 A1 | 11/2013 | | |
| WO | WO-2016100920 A1 | 6/2016 | | |
| WO | WO-2020177732 A1 | 9/2020 | | |

OTHER PUBLICATIONS

"International Application No. PCT/CN2020/077906, International Search Report and Written Opinion dated May 26, 2020", dated May 26, 2020), 8 pgs.

"Chinese Application No. 202080018475.7, First Office Action dated Apr. 22, 2022", (Apr. 22, 2022), 22 pgs.

* cited by examiner

DATA SYNCHRONIZATION IN A P2P NETWORK

CROSS-REFERENCE TO RELATED APPLICATIONS

This application is a continuation application of International Application No. PCT/CN2020/077906, filed Mar. 5, 2020, which claims the benefit of priority to U.S. Provisional Application No. 62/814,554, filed on Mar. 6, 2019, entitled "Data. Synchronization in a P2P Network," the benefit of priority of each of which is claimed herein, and which applications and publication are hereby incorporated herein by reference in their entirety.

TECHNICAL FIELD

The present disclosure is related to data synchronization in peer-to-peer (P2P) networks, including P2P wireless ad hoc networks. Some aspects are related to data synchronization in a P2P ad hoc network with synchronized timestamps.

BACKGROUND

A P2P network is created when two or more devices (mobile phones, smart TVs, PCs, routers, smart cameras, etc.) are connected to share computing resources without going through a separate server computer. A P2P network can be an ad hoc network, where the peer devices are connected through Bluetooth or WiFi to share resources. A P2P network can also be a permanent infrastructure that links a few devices over wired connections.

Mobile phones, pads, and various Internet-of-Things (IoT) computing devices are becoming increasingly popular. Data changes can happen in parallel on many devices and, therefore, it is vital for many applications executing on the computing devices to be able to synchronize (or sync) data changes across devices in a real-time manner.

SUMMARY

Various examples are now described to introduce a selection of concepts in a simplified form, which are further described below in the detailed description. The Summary is not intended to identify key or essential features of the claimed subject matter, nor is it intended to be used to limit the scope of the claimed subject matter.

According to a first aspect of the present disclosure, there is provided a computer-implemented method for data synchronization in a peer-to-peer (P2P) ad hoc network. The method includes retrieving network configuration information identifying a plurality of devices forming the P2P ad hoc network. A time offset is determined between a local physical time at a first device of the plurality of devices and a local physical time of a second device of the plurality of devices. A change in a data object of a plurality of data objects stored at a key-value store within the first device is detected. Each of the plurality of data objects includes a synchronization indicator. The change in the data object is communicated to at least the second device of the plurality of devices within the P2P ad hoc network based on the synchronization indicator. Upon receiving a confirmation from the at least the second device of receipt of the data object change, the network configuration information is updated with a timestamp based on the time offset and indicative of the local physical time at the first device when the data object change was communicated.

In a first implementation form of the method according to the first aspect as such, the network configuration information includes device profile information for each device of the plurality of devices forming the P2P ad hoc network. The device profile information includes device identification information associated with the device, a sending watermark indicative of a timestamp of a last successful communication to the device, and an online indicator indicative of whether the device is active within the P2P ad hoc network.

In a second implementation form of the method according to the first aspect as such or any preceding implementation form of the first aspect, where updating the network configuration information includes updating the sending watermark within the device profile information for the at least the second device with the timestamp indicative of the local physical time at the first device when the change in the data object is communicated to the at least the second device.

In a third implementation form of the method according to the first aspect as such or any preceding implementation form of the first aspect, where the timestamp comprises the local physical time at the first device when the change in the data object was communicated, with the local physical time being adjusted by the time offset.

In a fourth implementation form of the method according to the first aspect as such or any preceding implementation form of the first aspect, where each data object of the plurality of data objects further includes a key-value pair, a timestamp indicative of a time the data object was created, and a deletion flag indicating whether the data object is to be deleted.

In a fifth implementation form of the method according to the first aspect as such or any preceding implementation form of the first aspect, where the key-value pair for each of the plurality of data objects stored in the key-value store includes application data associated with an application executing on the first device.

In a sixth implementation form of the method according to the first aspect as such or any preceding implementation form of the first aspect, an updated version of the data object is received from a third device of the plurality of devices, the updated version of the data object including a timestamp of a local physical time at the third device when the updated version of the data object is communicated.

In a seventh implementation form of the method according to the first aspect as such or any preceding implementation form of the first aspect, the data object is replaced with the updated version of the data object when the timestamp indicative of the time the data object was created is smaller than the timestamp received with the updated version.

In an eighth implementation form of the method according to the first aspect as such or any preceding implementation form of the first aspect, the received updated version of the data object is discarded, when the timestamp indicative of the time the data object was created is greater than the timestamp received with the updated version.

According to a second aspect of the present disclosure, there is provided a data synchronization system including a memory that stores instructions and one or more processors in communication with the memory. The one or more processors execute the instructions to retrieve network configuration information identifying a plurality of devices forming a peer-to-peer (P2P) ad hoc network. A time offset between a local physical time at a first device of the plurality of devices and a local physical time of a second device of the plurality of devices is determined. A change in a data object of a plurality of data objects stored at a key-value store within the first device is detected, each of the plurality of data objects including a synchronization indicator. The change in the data object is communicated to at least the second device of the plurality of devices within the P2P ad hoc network based on the synchronization indicator. Upon receiving a confirmation from the at least the second device of receipt of the change in the data object, the network configuration information is updated with a timestamp. The timestamp is based on the time offset and indicative of the local physical time at the first device when the change in the data object was communicated.

In a first implementation form of the data synchronization system according to the second aspect as such, where the network configuration information includes device profile information for each device of the plurality of devices forming the P2P ad hoc network. The device profile information includes a device identification information associated with the device, a sending watermark indicative of a timestamp of a last successful communication to the device, and an online indicator indicative of whether the device is active within the P2P ad hoc network.

In a second implementation form of the data synchronization system according to the second aspect as such or any preceding implementation form of the second aspect, to update the network configuration information, the one or more processors execute the instructions to update the sending watermark within the device profile information for the at least the second device with the timestamp indicative of the local physical time at the first device when the change in the data object is communicated to at least the second device.

In a second implementation form of the data synchronization system according to the second aspect as such or any preceding implementation form of the second aspect, the timestamp comprises the local physical time at the first device when the data object change was communicated, with the local physical time being adjusted by the time offset.

In a third implementation form of the data synchronization system according to the second aspect as such or any preceding implementation form of the second aspect, where each data object of the plurality of data objects further includes a key-value pair, a timestamp indicative of a time the data object was created, and a deletion flag indicating whether the data object is to be deleted.

In a fourth implementation form of the data synchronization system according to the second aspect as such or any preceding implementation form of the second aspect, where the key-value pair for each of the plurality of data objects stored in the key-value store comprises application data associated with an application executing on the first device.

In a fifth implementation form of the data synchronization system according to the second aspect as such or any preceding implementation form of the second aspect, where the one or more processors execute the instructions to receive an updated version of the data object from a third device of the plurality of devices, the updated version of the data object including a timestamp of local physical time at the third device when the updated version of the data object is communicated.

In a sixth implementation form of the data synchronization system according to the second aspect as such or any preceding implementation form of the second aspect, where the one or more processors execute the instructions to replace the data object with the updated version of the data object, when the timestamp indicative of the time the data object was created is smaller than the timestamp received with the updated version.

According to a third aspect of the present disclosure, there is provided a non-transitory computer-readable medium storing instruction for data synchronization in a peer-to-peer (P2P) ad hoc network, that when executed by one or more processors, cause the one or more processors to perform operations. The operations include retrieving network configuration information identifying a plurality of devices forming the P2P ad hoc network. A time offset between a local physical time at a first device of the plurality of devices and a local physical time of a second device of the plurality of devices is determined. A change is detected in a data object of a plurality of data objects stored at a key-value store within the first device, each of the plurality of data objects including a synchronization indicator. The change in the data object is communicated to at least the second device of the plurality of devices within the P2P ad hoc network based on the synchronization indicator. Upon receiving a confirmation from the at least the second device of receipt of the change in the data object, the network configuration information is updated with a timestamp. The timestamp is based on the time offset and indicative of the local physical time at the first device when the data object change was communicated.

In a first implementation form of the non-transitory computer-readable medium according to the third aspect as such, where to determine the time offset, the instructions further cause the one or more processors to communicate a synchronization request from the first device to the second device at a time associated with a first timestamp of the first device. A synchronization response is received from the second device at a second timestamp of the first device, the synchronization response including a first timestamp of the second device and a second timestamp of the second device indicative of the local time the second device received the synchronization request and sent the synchronization response, respectively. The time offset is determined based on the first and second timestamps of the first device and the first and second timestamps of the second device.

In a second implementation form of the non-transitory computer-readable medium according to the third aspect as such or any preceding implementation form of the third aspect, where the instructions further cause the one or more processors to receive an updated version of the data object from at least a third device of the plurality of devices, the updated version of the data object including a timestamp of a local physical time at the at least third device when the updated version of the data object is communicated. One of the following operations is performed: replacing the data object with the updated version of the data object when a timestamp indicative of the time the data object was created at the first device is smaller than the timestamp received with the updated version; or discarding the received updated version of the data object, when the timestamp indicative of the time the data object was created at the first device is greater than the timestamp received with the updated version.

Any of the foregoing examples may be combined with any one or more of the other foregoing examples to create a new embodiment within the scope of the present disclosure.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

DETAILED DESCRIPTION

It should be understood at the outset that although an illustrative implementation of one or more embodiments is provided below, the disclosed systems and/or methods described with respect to FIGS. 1-11 may be implemented using any number of techniques, whether currently known or not yet in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In the following description, reference is made to the accompanying drawings that form a part hereof, and in which are shown, by way of illustration, specific embodiments which may be practiced. These embodiments are described in sufficient detail to enable those skilled in the art to practice the inventive subject matter, and it is to be understood that other embodiments may be utilized, and that structural, logical, and electrical changes may be made without departing from the scope of the present disclosure. The following description of example embodiments is, therefore, not to be taken in a limiting sense, and the scope of the present disclosure is defined by the appended claims.

As used herein, the term "network-based service infrastructure" includes a plurality of network devices providing on-demand computing capacity (e.g., via one or more virtual machines or other virtual resources running on the network devices) and storage capacity as a service to a community of end-recipients (e.g., customers of the service infrastructure), where the end recipients are communicatively coupled to the network devices within the service infrastructure via a network. The customers of the service infrastructure can use one or more computing devices (also referred to as customer devices or host devices) to access and manage the services (e.g., computing or storage services) provided by the service infrastructure via the network. The customer devices, the network, and the network-based service infrastructure can be collectively referred to as a "network architecture." The customers of the service infrastructure can also be referred to as "users."

Figure 2:
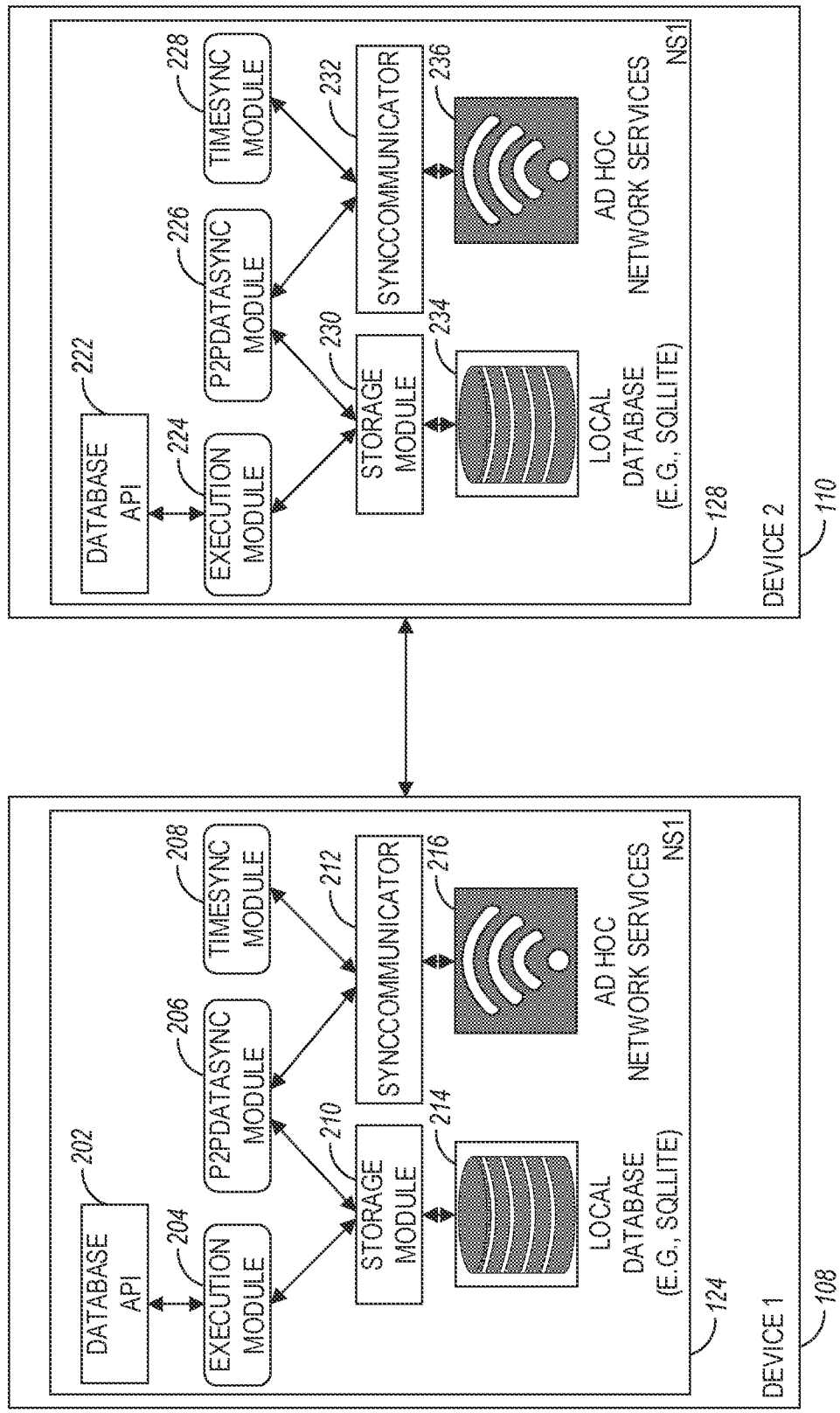
FIG. 2 is a block diagram illustrating natural store modules within devices in a P2P ad hoc network, according to some example embodiments.

As used herein, the term "natural store" refers to a collection of modules comprising suitable circuitry, logic, interfaces, and/or code that can be used within computing devices within a P2P network to provide functionalities associated with data synchronization, timestamp synchronization, and other functionalities as discussed hereinbelow. A diagram of an example natural store used by a P2P network device is illustrated in FIG. 2.

P2P ad hoc networks can impose challenges to data synchronization since devices can join and leave at any time, either permanently (i.e., membership change) or temporarily (i.e., the devices go online/offline). In addition, data conflicts can be created when concurrent data updates take place using the same data but on different devices. A solution can be to resolve the conflicts based on a change timestamp. However, clocks on devices can become different when clock drift happens, leading to non-synchronized timestamps within the P2P ad hoc network.

Techniques disclosed herein can be used for real-time data synchronization and device timestamp synchronization in a P2P ad hoc network, which does not require a server or a network backend to perform the centralized coordination. Such an approach enables low latency data synchronization and also works when no Internet connection is available. More specifically, techniques disclosed herein use a reliable cross-platform real-time P2P data synchronization algorithm using a timestamp. Additionally, to have a consistent timestamp across different devices, timestamp synchronization techniques across multiple devices within the P2P network are also disclosed.

To perform data synchronization across devices in a P2P ad hoc network, a natural store (or NaturalStore or NS) is maintained at each device, where each store includes a database providing key-value store functionalities, a P2PDataSync module, a TimeSync module, and a SyncCommunicator module. The P2PDataSync module handles data synchronization across devices, including retrying data communication upon sync failure. The TimeSync module handles synchronization of timestamps across multiple devices by determining, at each device, a timing offset between the device and each of a plurality of remaining devices within the P2P network. The maximum offset is then selected as the device offset for the particular device, and every time a timestamp is generated by the device, the timestamp is adjusted by the device offset. The SyncCommunicator module is responsible for sending data, device notification events, and timestamps across devices within the P2P network. Additional data synchronization and timestamp synchronization functionalities provided by the natural store are discussed herein below.

Benefits of using the disclosed techniques include (1) the key-value store functionalities provided by each natural store can continue to function even when the device goes offline (or network connections to other devices or the main network are interrupted), and data sync resumes automatically when the device goes online (or the network connections are recovered); and (2) a lightweight P2P timestamp synchronization algorithm is used for adjusting timestamps and synchronizing device timing within the P2P network without the need of a central server. Furthermore, the disclosed data synchronization techniques are P2P-based and do not require a leader e.g., a central server) to coordinate data synchronization, which can become a potential single point of failure. In addition, the timestamp-based conflict resolution techniques are more generally applicable than conflict-free replicated data types (CRDT)-based approaches, with the P2P timestamp sync techniques having an improved response time and being able to synchronize device timing when a network connection (e.g., a connection to the Internet) is not available in comparison to network time protocol (NTP)-based approaches where a connection to an NTP server is essential.

Figure 1:
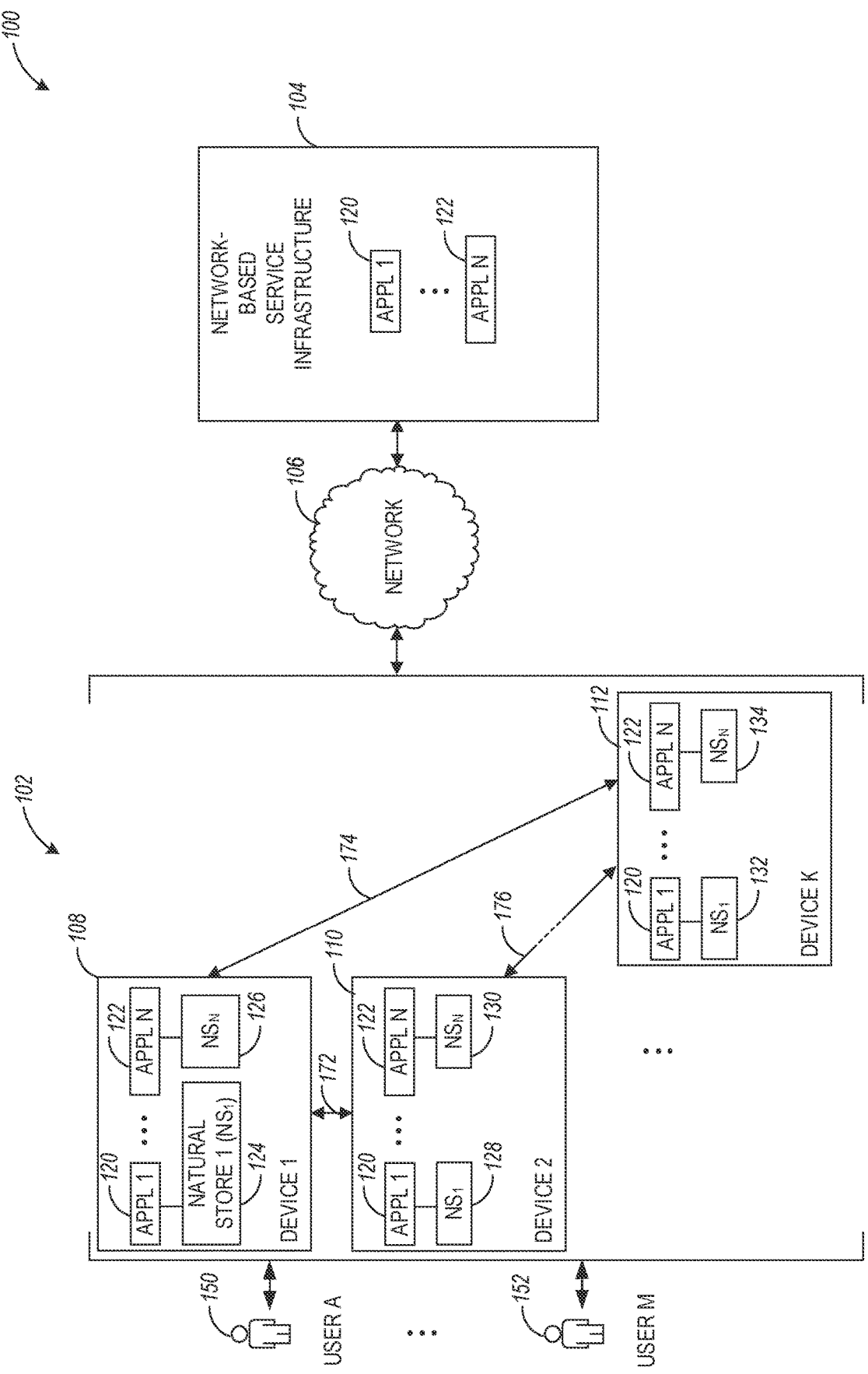
FIG. 1 is a high-level system overview of network architecture with a P2P ad hoc network using natural store (NS) modules providing data synchronization and timestamp synchronization functionalities, according to some example embodiments.

FIG. 1 is a high-level system overview of network architecture with a P2P ad hoc network using natural store modules providing data synchronization and timestamp synchronization functionalities, according to some example embodiments. Referring to FIG. 1, the network architecture 100 can include a plurality of devices (e.g., user devices) 108, 110, ..., 112 communicatively coupled to a network-based service infrastructure 104 via a network 106. In some aspects, the devices 108, ..., 112 can form a P2P ad hoc network 102 and can be associated with corresponding users 150, 152. Each of the users 150, ..., 152 can use one or more of the devices 108, ..., 112 to interact with the network-based service infrastructure 104 or with other devices within the P2P ad hoc network using, e.g., network access clients (not illustrated in FIG. 1) that can be implemented within the devices as web clients or application (app) clients.

Each of the users 150, ..., 152 may be a human user (e.g., a human being), a machine user (e.g., a computer configured by a software program to interact with the devices 108, ..., 112 and the network-based service infrastructure 104), or any suitable combination thereof (e.g., a human-assisted by a machine or a machine supervised by a human). The users 150, ..., 152 are not part of the network architecture 100 but are each associated with one or more of the devices 108, ..., 112 and may be users of the devices (e.g., the user 150 may be an owner of the device 108, and the user 152 may be an owner of the device 112). For example, device 108 may be a desktop computer, a vehicle computer, a tablet computer, a navigational device, a portable media device, or a smartphone belonging to user 150. Users 150, ..., 152 can use devices 108, ..., 112 to access services (e.g., computing services or storage-related services) provided by the network-based service infrastructure 104. The computing services can be provided by one or more computing devices within the infrastructure 104 and can include serverless computing services such as instantiating and using virtual machines (VMs), virtual private clouds (VPCs), application containers (e.g., warm containers instantiated within a VPC), and so forth. The storage-related services can include data storage services, data replication services, and so forth. The computing services can further include providing software as a service (SaaS), Infrastructure as a Service (IaaS), Platform as a Service (PaaS), Desktop as a Service (DaaS), managed software as a service (MSaaS), mobile backend as a service (MBaaS), and information technology management as a service (ITMaaS). For example, the network-based service infrastructure 104 can provide one or more of the devices 108, ..., 112 with access to applications 120, ..., 122 in connection with a SaaS arrangement.

Any of the devices shown in FIG. 1 may be implemented in a general-purpose computer modified (e.g., configured or programmed) by software to be a special-purpose computer to perform the functions described herein for that machine, database, or device. As used herein, a "database" is a data storage resource that stores data structured as a text file, a table, a spreadsheet, a relational database (e.g., an object-relational database, a NoSQL, database, a network or graph database), a triple store, a hierarchical data store, or any suitable combination thereof. Additionally, data accessed (or stored) via an application programming interface (API) or remote procedure call (RPC) may be considered to be accessed from (or stored to) a database. Moreover, any two or more of the devices or databases illustrated in FIG. 1 may be combined into a single machine, database, or device, and the functions described herein for any single machine, database, or device may be subdivided among multiple machines, databases, or devices.

Network 106 may be any network that enables the communication between or among machines, databases, and devices (e.g., devices 108, ..., 112 and devices within the network-based service infrastructure 104). Accordingly, network 106 may be a wired network, a wireless network (e.g, a mobile or cellular network), or any suitable combination thereof. Network 106 may include one or more portions that constitute a private network, a public network (e.g, the Internet), or any suitable combination thereof.

In some aspects, the computing devices 108, ..., 112 can be coupled to each other via wireless communication links 172, 174, ..., 176, forming the P2P ad hoc network 102. Additionally, instead of using applications 120, ..., 122 in a SaaS arrangement provided by the network-based service infrastructure 104, each of the computing devices 108, ..., 112 can be executing one or more of the applications 120, ..., 122 using the corresponding device resources. Additionally, each of the applications 120, ..., 122 executing on a device within the P2P ad hoc network 102 is associated with a corresponding natural store that can include various modules (as described hereinbelow) for providing data synchronization and timestamp synchronization services within the P2P ad hoc network 102. For example, applications 120, ..., 122 are associated with corresponding natural stores (NSes) 124, ..., 126 (within device 108), 128 ..., 130 (within device 110), and 132, ..., 134 (within device 112). In this regard, a natural store can be uniquely identified and associated with a given application and a given device executing the application.

In some aspects, a device within the P2P ad hoc network 102 can be used by more than one of the users 150, ..., 152. In this regard, a natural store can also be uniquely identified and associated with a given application, a given device executing such an application, and a given user that is using the device. Put another way, if application 120 executing on device 108 is used by both users 150 and 152, two separate natural stores will be created within device 108 both natural stores will be associated with application 120 and device 108, with one of the natural stores also being associated with the user 150 and the other natural store associated with user 152.

FIG. 2 is a block diagram illustrating natural store modules within devices in a P2P ad hoc network, according to some example embodiments. Referring to FIG. 2, there is illustrated a more detailed diagram of the natural stores (NSes) 124 and 128 associated with an application (app) 120 and located within devices 108 and 110, respectively.

The NS 124 is a natural store with the following properties: (1) handling APIs such as Put, Get, Remove, and RangeScan APIs in connection with data stored in a local database (e.g., 214); (2) providing cross-platform support, including Android, Windows, Linux, and iOS; (3) providing a secure environment as each device app and device user combination can have a single NS associated with such combination; (4) facilitating synchronization as each NS can be considered as a separate sync unit within a device and database transaction can be supported within the NS; and (5) providing callback support over NS status change events, such as data is added, updated, or removed from local storage, or when a device joins or leaves the P2P ad hoc network.

The NS 124 can include a local database, a distributed key-value store including a database application programming interface (API) 202, an execution module 204, a P2P Data Synchronization (P2PDataSync) module 206, a time synchronization (TimeSync) module 208, a storage module 210, a synchronization communicator (SyncCommunicator) module 212, a local database 214, and an ad hoc network services module 216.

The database API 202 can be configured as a public API for accessing by an application developer) data and timestamp sync functionalities provided by one or more of the remaining modules 204-216 within the NS 124. The execution module 204 may comprise suitable circuitry, logic, interfaces, and/or code and is configured as an execution engine to parse and execute various APIs including the database API 202. The P2PDataSync module 206 may comprise suitable circuitry, logic, interfaces, and/or code and is configured to perform P2P data sync (including data sync retries when data sync failure is detected) across devices within the P2P ad hoc network 102. The TimeSync module 208 may comprise suitable circuitry, logic, interfaces, and/or code and is configured to perform timestamp synchronization for device 108. The storage module 210 may comprise suitable circuitry, logic, interfaces, and/or code and is configured to persist user data in local device storage, such as the local database 214 or another type of storage. The SyncCommunicator module 212 may comprise suitable circuitry, logic, interfaces, and/or code and is configured to initiate communication of data between device 108 and other devices within the P2P ad hoc network 102 via wired or wireless connections (e.g., Bluetooth or another type of wireless connection) and using the ad hoc network services module 216. The ad hoc network services module 216 may comprise suitable circuitry, logic, interfaces, and/or code and is configured to receive and send data as well as device online/offline events from peer devices in the P2P network 102 through callback APIs. In some aspects, the SyncCommunicator module 212 can use the ad hoc network services module 216 to send data and local timestamp information, as well as to receive device online/'offline events from peer devices in the P2P network 102 through callback APIs.

The NS 128 within device 110 can also be a distributed key-value store including a database API 222, an execution module 224, a P2PDataSync module 226, a TimeSync module 228, a storage module 230, a SyncCommunicator module 232, a local database 234, and an ad hoc network services module 236. Modules 222-236 within the NS 128 have similar functionalities as corresponding modules 202-216 within the NS 124 as described hereinabove. Additionally, the remaining NSs illustrated in FIG. 1 and associated with other devices (or applications executing on the devices) within the P2P ad hoc network can include the same modules as NS 124 discussed in reference to FIG. 2.

Figure 3:
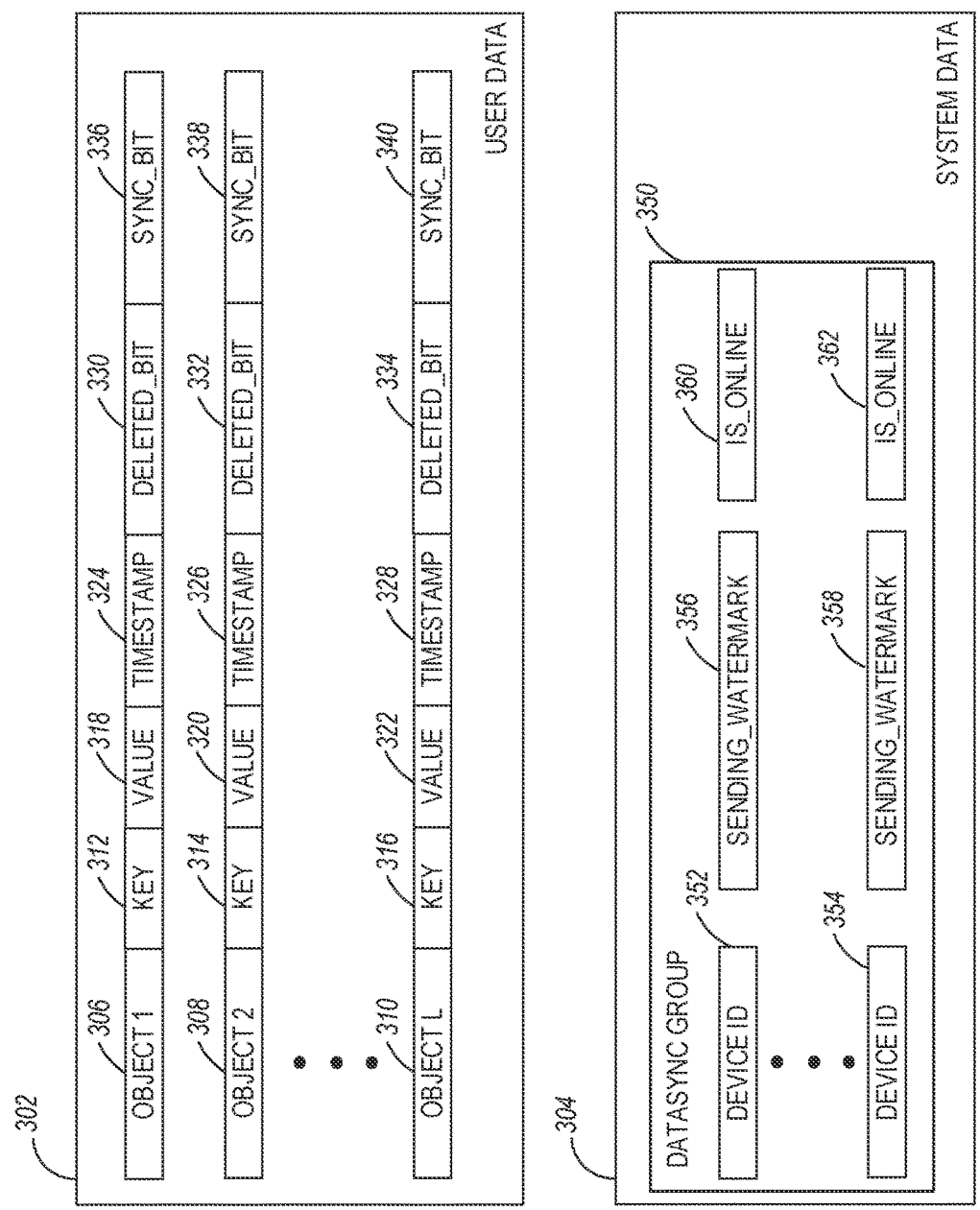
FIG. 3 illustrates user data and system data configuration stored within a local database of a natural store, according to some example embodiments.

FIG. 3 illustrates user data and system data configuration stored within a local database 214 of a natural store (e.g., NS 124), according to some example embodiments. Referring to FIG. 3, the local database 214 is configured to store user data 302 and system data 304. The user data 302 can be stored as individual data objects (e.g., objects 306, 308, . . . , 310) in a key-value format. More specifically, each of objects 306, 308, . . . , 310 can include the following corresponding data: a key (e.g., 312, 314, . . . , 316), a value (e.g., 318, 320, . . . , 322), a timestamp (e.g., 324, 326, . . . , 328), a deleted_bit (e.g., 330, 332, . . . , 334), and a sync_bit (e.g., 336, 338, . . . , 340). The timestamp (e.g., 324, 326, . . . , 328) is a local device timestamp when the object is created. The deleted_bit (e.g., 330, 332, 334) is a bit that can be set to TRUE (e.g., set to a value of 1) when the corresponding data object is to be deleted from the local database. An object with a set deleted_bit can be periodically garbage collected and removed from the local database. The sync_bit (e.g., 336, 338, . . . , 340) is a bit that can be set to TRUE (e.g., set to a value of 1) to indicate that the corresponding object needs to be synced to other peers in the P2P network (e.g., other devices listed in the DataSync Group within the system data 304). For example, the sync_bit can be set to TRUE if the latest object change is from a Put operation executed within the local device (e.g., 108). In some aspects, the sync_bit can be unset (e.g., set to FALSE, or a value of 0) when the latest object change is from a Write operation from a peer device (e.g., an updated version of the object is received from a peer device, where the updated version has a timestamp that is higher than a current timestamp associated with the local version of the object).

In some aspects, data can be synchronously committed (i.e., stored) into the user data 302 of the local database 214 of the NS 124 based on the following sequence: (1) data is stored as a new object within the user data 302 with a corresponding timestamp using the local device time when the data is stored; (2) the sync_bit of the newly created object is set; and (3) the P2PDataSync module 206 can initiate data sync of the object across the remaining devices within the P2P network using the SynchCommunicator module 212 and the ad hoc network services 216 (e.g., via a background P2P sync task).

The system data 304 can include a data synchronization group (or DataSync Group) 350 as well as other system metadata. The DataSync Group 350 can include system information associated with other peer devices that are in the same P2P ad hoc network as the current device (e.g., device 108). The DataSync Group 350 can include device identification information (352, . . . , 354) identifying the other peer devices in the P2P network (e.g., by network ID or another type of device ID), sending watermark information (or sending_watermark) 356, . . . , 358, as well as online indicator information (or is_online) 360, . . . , 362 (which can be a flag indicating whether the corresponding device is online and part of the P2P network or offline and not part of the P2P network).

In some aspects, the device identification information 352, . . . , 354 within the DataSync Group 350 can include identification information of the NS (i.e., NS_ID) the local database 214 is part of. Put another way, the NS_ID for each of the devices within the DataSync Group 350 can be the same.

In some aspects, the sending_watermark information 356, . . . , 358 includes a local timestamp indicating a local time when device 108 successfully communicated data to the particular device associated with the corresponding device ID. For example, when a new object (or an updated version of an existing object) is synced and communicated by device 108 to other peer devices for an update, device 108 can update the sending_watermark information with the timestamp when the object was communicated to a particular device upon receipt of a confirmation from the particular device that the communicated object is received and synced by the particular device.

Figure 4:
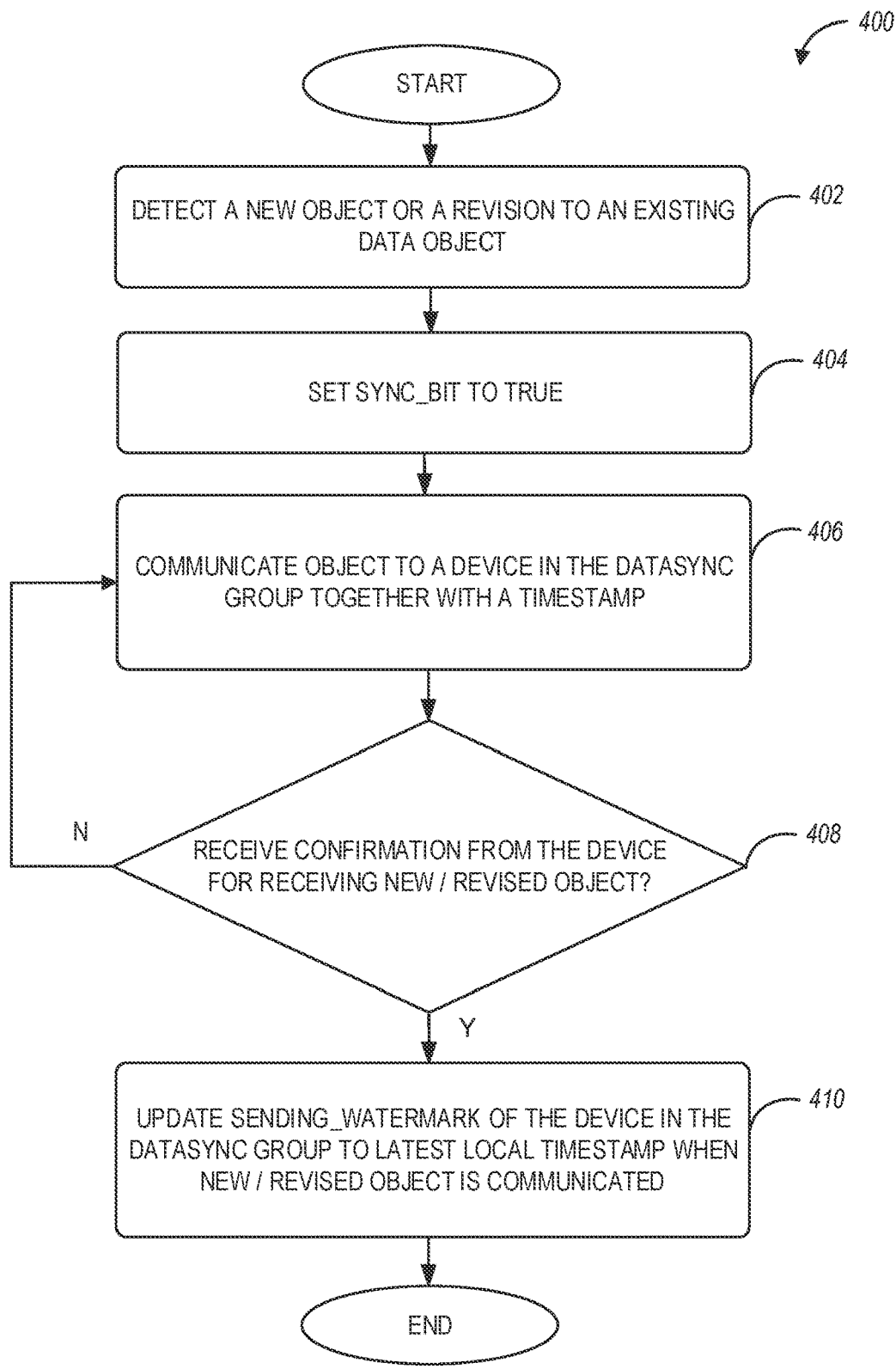
FIG. 4 is a flowchart of a method suitable for synchronizing data within a P2P ad hoc network, according to some example embodiments.

In some aspects, a device can be added into or removed from the DataSync Group 350 dynamically. In some aspects, during dynamic data synchronization between a sending device and a receiving device within the P2P ad hoc network, each NS is responsible for sending (as well as re-sending upon failure) local data changes (e.g., new data Objects or updates to existing data objects) to peer devices indicated by the DataSync Group (and when the sync_bit for the data object is set). The NS can track data sync progress for each peer device and can continuously send (and re-send) from the sending_watermark of the particular data object. In this regard, data sync from each peer guarantees the objects are sent in the order of the object timestamp. At a receiving device, if the received object has a larger timestamp than a corresponding local object (i.e., if an update to an object is communicated with a timestamp that is larger than the timestamp for the same object stored at the receiving device), then the local object at the receiving device is replaced with the received object (and the sync_bit of the received object as stored in the local database of the receiving device is set to FALSE). If the received object has a timestamp that is smaller than the timestamp of the local object, then the received object is discarded by the receiving device. Consequently, the above data synchronization technique is characterized by data synchronization consistency of new and updated data objects, no data loss within the P2P ad hoc network, and data synchronization support across different platforms, with online or offline device status FIG. 4 is a flowchart of a method suitable for synchronizing data within a P2P ad hoc network, according to some example embodiments. Referring to FIG. 4, method 400 includes operations 402, 404, 406, 408, and 410. By way of example and not limitation, method 400 is described as being performed by one or more of the modules within the NS 124 of device 108.

At operation 402, a new object or a revision to an existing data object is detected. For example, the P2PDataSync module 206 can detect a new data object received via the database API 202 for storage in the local database 214. At operation 404, the sync_bit of the new data object is set to TRUE. At operation 406, the new object (together with the local timestamp indicative of a local time the object is recorded within the database 214) is communicated to one or more peer devices indicated by the DataSync Group 350 of the NS 124. At operation 408, the NS 124 can detect whether a confirmation is received from the receiving device that the new object has been received. If no confirmation is received, the object is re-sent at operation 406. If a confirmation is received, at operation 410, the sending_watermark corresponding to the receiving device within the DataSync Group 350 is updated with the local timestamp of the time when the object was communicated to the receiving device.

Figure 5:
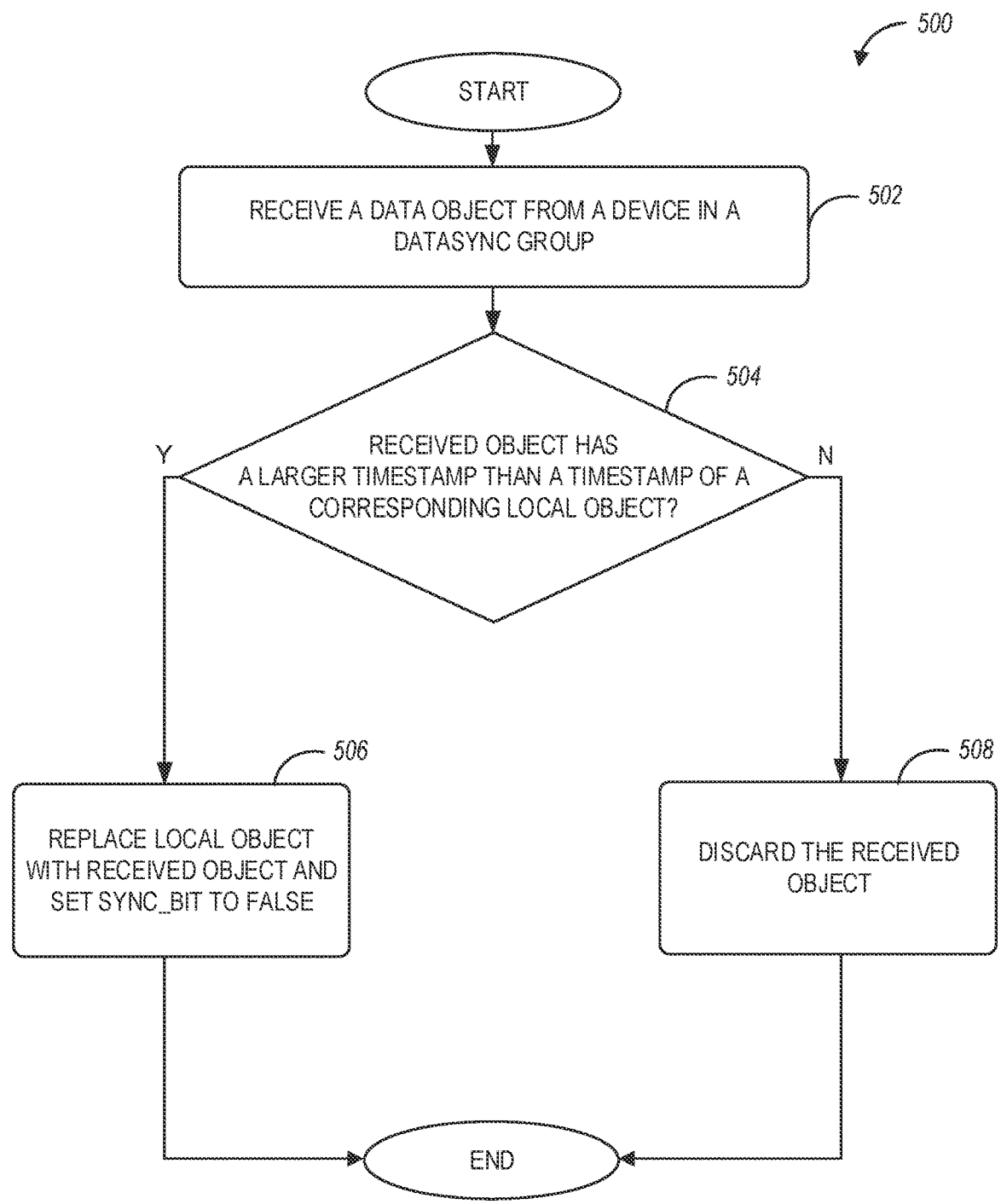
FIG. 5 is a flowchart of a method suitable for replacing local data with received data or discarding the received data during data synchronization within a P2P ad hoc network, according to some example embodiments.

FIG. 5 is a flowchart of a method suitable for replacing local data with received data or discarding the received data during data synchronization within a P2P ad hoc network, according to some example embodiments. Referring to FIG. 5, method 500 includes operations 502, 504, 506, and 508. By way of example and not limitation, method 500 is described as being performed by one or more of the modules within the NS 124 of device 108. At operation 502, a data object is received at a first device (e.g., device 108) from a second device (e.g., device 110), where the second device is listed in a DataSync Group (e.g., 350) of the first device. At operation 504, NS 124 can determine whether the received object has a larger timestamp than a timestamp for a corresponding local object. For example, device 108 can receive an update to object 306 and the timestamp of the received update can be compared to timestamp 324 associated with object 306 within user data 302 of the local database 214.

If the received object has a larger timestamp, at operation 506, the local object 306 is replaced with the received object and the sync_bit (e.g., the sync_bit 336 of FIG. 3) for the replaced object is set to FALSE. If the received object has a smaller timestamp, at operation 508, the received object is discarded by the NS 124 of device 108.

Figure 6:
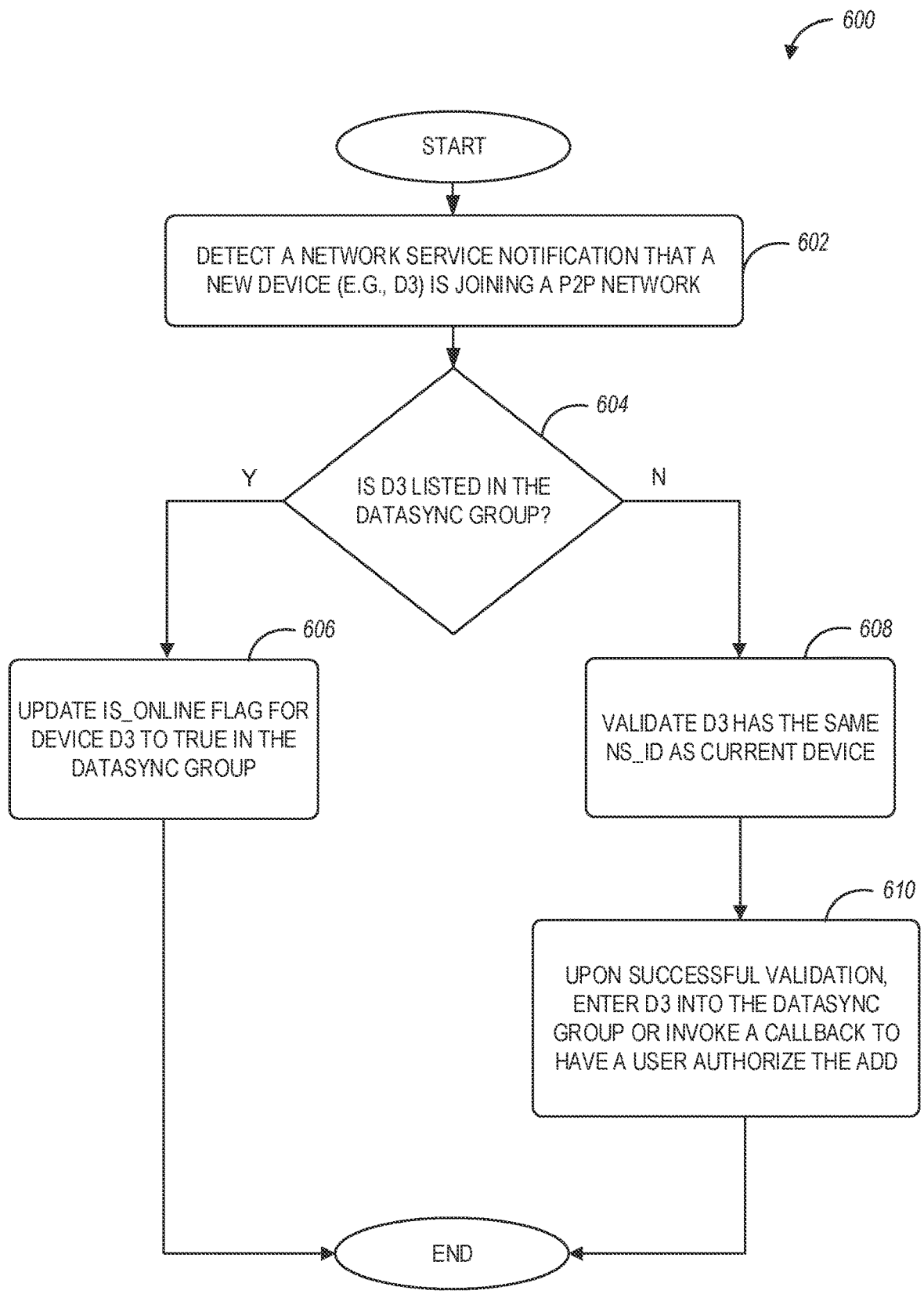
FIG. 6 is a flowchart of a method suitable for updating a data synchronization group when a new device has joined a P2P ad hoc network, according to some example embodiments.

FIG. 6 is a flowchart of a method suitable for updating a data synchronization group when a new device has joined a P2P ad hoc network, according to some example embodiments. Referring to FIG. 6, method 600 includes operations 602, 604, 606, 608, and 610. By way of example and not limitation, method 600 is described as being performed by one or more of the modules within the NS 124 of device 108. At operation 602, a network service notification is detected (e.g., at device 108) that a new device (e.g., device 110) is joining the P2P ad hoc network 102, For example, the ad hoc network services module 216 can receive a callback and the SyncCommunicator module 212 can inform the P2PDataSync module 206 that device 110 is rejoining the P2P ad hoc network 102 via the callback. At operation 604, the P2PDataSync module 206 can determine whether device 110 is listed within the DataSync Group 350 of NS 124. If device 110 is listed within the DataSync Group 350, at operation 606, the is_online flag for device 110 is set to TRUE. If device 110 is not listed within the DataSync Group 350, at operation 608, device 110 can be validated (e.g., by the P2PDataSync module 206) that the NS ID of device 110 is the same NS ID as used by NS 124 of device 108. Upon successful validation, at operation 610, device 110 can be entered into the DataSync Group 350. In the alternative, a callback can be invoked to have a user authorize the addition of device 110 into the DataSync Group 350.

From the perspective of device 110, the SyncCommunicator module of device 110 can inform the P2PDataSync module (of device 110) that device 108 is part of the P2P ad hoc network 102. The P2PDataSync module of device 110 can check its DataSync Group and confirm that device 108 is part of the group. The P2PDataSync module then marks the is_online flag for device 108 as TRUE.

In aspects when a device leaves the P2P network permanently, or a new device joins the P2P network for the first time, similar processing sequences as described above can take place for purposes of updating corresponding DataSync Groups of the peer devices within the P2P network.

Figure 7:
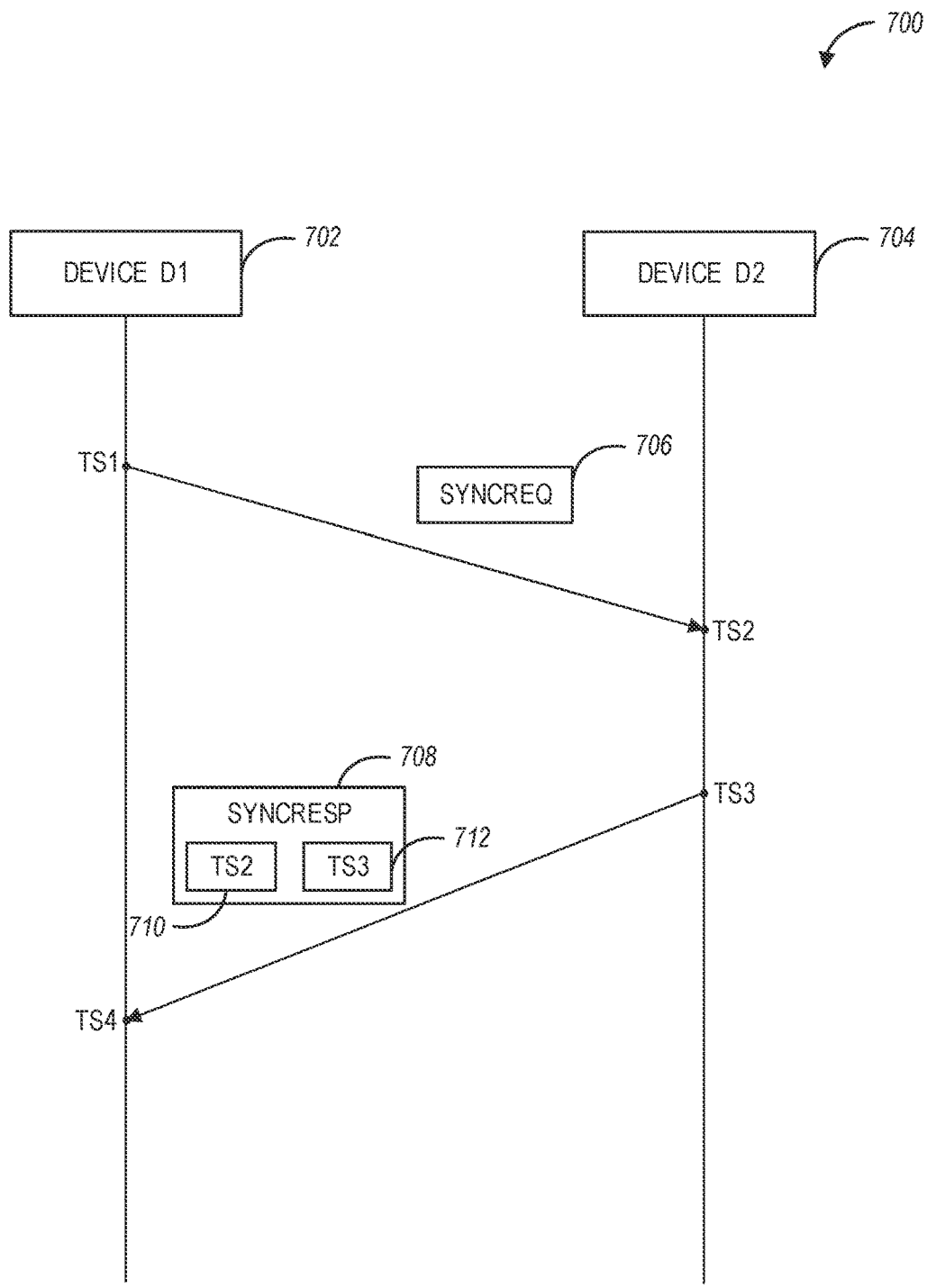
FIG. 7 is a block diagram illustrating a communication exchange between devices in a P2P ad hoc network to obtain a timestamp offset between the devices for purposes of timestamp synchronization, according to some example embodiments.

FIG. 7 is a block diagram illustrating a communication exchange 700 between devices in a P2P ad hoc network to obtain a timestamp offset between the devices for purposes of timestamp synchronization, according to some example embodiments.

As discussed above, the P2P data sync functionalities performed by the P2PDataSync module 206 rely on each device to provide a consistent timestamp. Such timestamp is used to maintain a global order within the P2P ad hoc network.

Each device within the P2P ad hoc network 102 has its physical clock. Even when initially set accurately, device physical clocks will differ after some amount of time due to clock drift, caused by clocks counting time at slightly different rates. Standard ways to synchronize a clock on a device is to use an NTP/PTP protocol, where the device's physical clock is corrected based on a centralized server. Once each device in the network finishes the NTP/PTP-based synchronization, the devices are synchronized to each other within the group. Since in an ad hoc wireless network, a wireless connection to a centralized server is not always available, NTP/PTP-based synchronization with a centralized server may not always be possible. Therefore, techniques disclosed herein can be used to synchronize timestamps between devices within a P2P ad hoc network. The techniques disclosed herein for of timestamp synchronization are characterized by the following properties: no Internet access is required; there is no single point of failure (i.e., pure P2P-based timestamp synchronization); no leader is required and each device calculates its timestamp offset; timestamp on each device increases monotonically, which is a feature that is used for data synchronization using NS modules as discussed herein; frequency of timestamp calibration can be adjusted to achieve the desired accuracy; and timestamp synchronization is scalable (implementation can be linear to the number of devices in the P2P network or timestamp synchronization can be limited to a small number (i.e., a constant) of neighboring P2P network devices).

FIG. 7 illustrates in greater detail calculating a timestamp offset between two devices, such as device 702 and device 704. Device 702 can record a starting timestamp as TS1 when a synchronization request (SyncReq) 706 and is communicated to device 704. Device 704 can record a local timestamp TS2 when the synchronization request 706 is received. Device 704 can further record a timestamp TS3 when a synchronization response (SyncResp) 708 is communicated to device 702. The synchronization response 708 includes both timestamps TS2 and TS3 of device 704. Device 702 can record a local timestamp TS4 when the synchronization response 708 is received. In this regard, device 702 can calculate a one-way network delay as DELAY=((TS4-TS1)-(TS3-TS2))/2, where "/" indicates a division operation. Device 702 can then calculate an offset with device 704 as OFFSET=TS2-TS1-DELAY.

Device 702 can determine similar offsets with remaining devices within the P2P ad hoc network and determine a final offset to be applied to device 702 timestamps to achieve timestamp synchronization within the P2P ad hoc network. In some aspects, the timestamps and the determined OFFSET can be measured in milliseconds or another unit of time.

Figure 8:
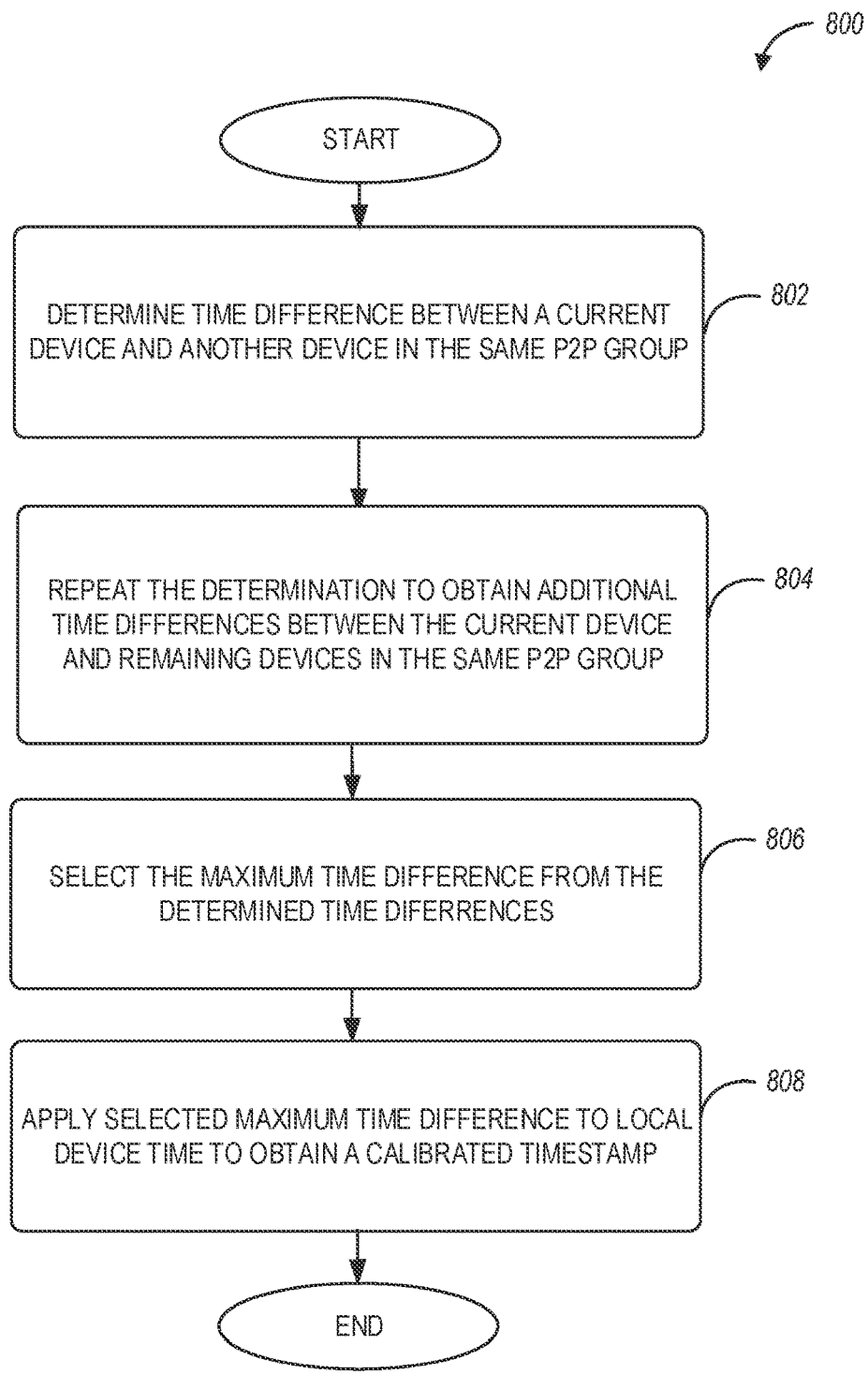
FIG. 8 is a flowchart of a method suitable for timestamp synchronization, according to some example embodiments.

FIG. 8 is a flowchart of a method suitable for timestamp synchronization, according to some example embodiments. Once the timestamp offset between two devices is calculated (e.g., OFFSET between devices 702 and 704 as discussed hereinabove), timestamp synchronization within the P2P ad hoc network can be performed using the operations in FIG. 8.

Referring to FIG. 8, method 800 includes operations 802, 804, 806, and 808. By way of example and not limitation, method 800 is described as being performed by one or more of the modules within the NS 124 of device 108 (e.g., the TimeSync module 208). At operation 802, a time difference (or offset) between a current device and another device in the same P2P group is determined (e.g., as discussed in reference to FIG. 7). At operation 804, the offset determination is repeated to obtain additional time differences (or offsets) between the current device and remaining devices in the same P2P group. At operation 806, the maximum time difference (or offset) from the determined time differences is selected. At operation 808, the selected maximum time difference is applied to the local device time to obtain a calibrated/synchronized timestamp.

Figure 9:
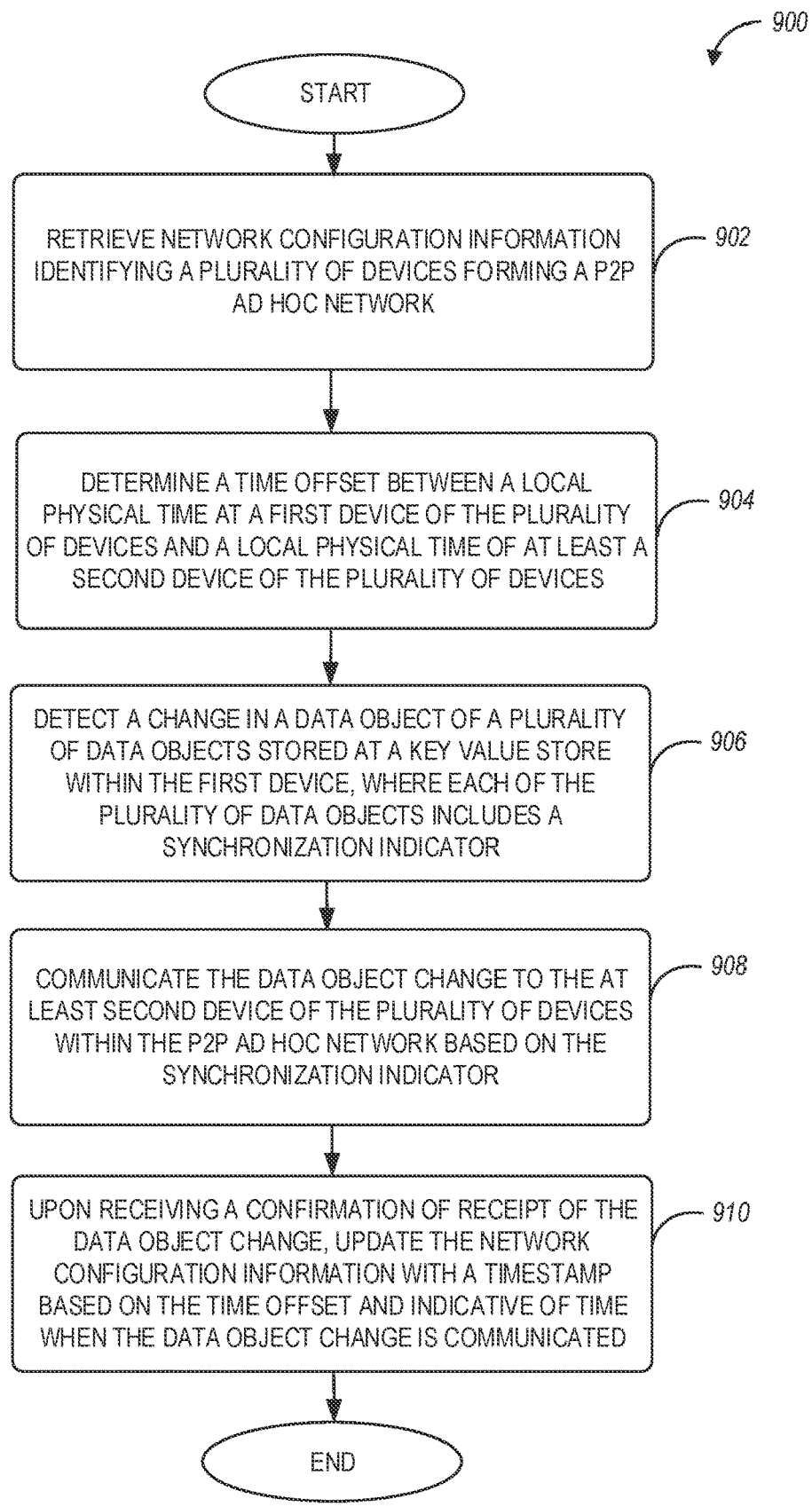
FIG. 9 is a flowchart of a method suitable for data synchronization in a P2P ad hoc network, according to some example embodiments.

FIG. 9 is a flowchart of a method suitable for data synchronization in a P2P ad hoc network, according to some example embodiments. Method 900 includes operations 902, 904, 906, 908, and 910. By way of example and not limitation, method 900 is described as being performed by one or more of the modules within the NS 124 of device 108. At operation 902, network configuration information identifying a plurality of devices forming the P2P ad hoc network is retrieved. For example, the network configuration information can include system data such as system information describing the DataSync Group 350 of NS 124 within device 108.

At operation 904, a time offset is determined between a local physical time at a first device e.g., device 108) of the plurality of devices and a local physical time of at least a second device (e.g., device 110) of the plurality of devices. For example, a plurality of offsets can be determined by device 108 (e.g., as discussed in connection with FIG. 7 and FIG. 8) and a maximum offset can be selected by device 108 for purposes of timestamp synchronization.

At operation 906, a change in a data object of a plurality of data objects stored at a key-value store within the first device is detected, where each of the plurality of data objects includes a synchronization indicator. For example, a change in data object 306 is detected (e.g., by the P2PDataSync module 206), where data object 306 includes sync_bit 336 as the synchronization indicator.

At operation 908, the data object change is communicated to at least a second device of the plurality of devices within the P2P ad hoc network based on the synchronization indicator. For example, if sync_bit is set to TRUE, data object 306 is communicated to other devices for synchronization.

At operation 910, upon receiving a confirmation from the at least second device of receipt of the data object change, the network configuration information is updated with a timestamp. For example, after device 108 communicates updated object 306 to device 110 at a local timestamp (e.g., time of communication), the timestamp can be stored in the sending_watermark field corresponding to device 110 within the DataSync Group 350 upon receiving a confirmation from device 110 of receiving the updated object. The timestamp generated by device 108 is based on the time offset (e.g., as determined at operation 904) and is indicative of the local physical time at the first device (e.g., device 108) when the data object change is communicated.

Figure 10:
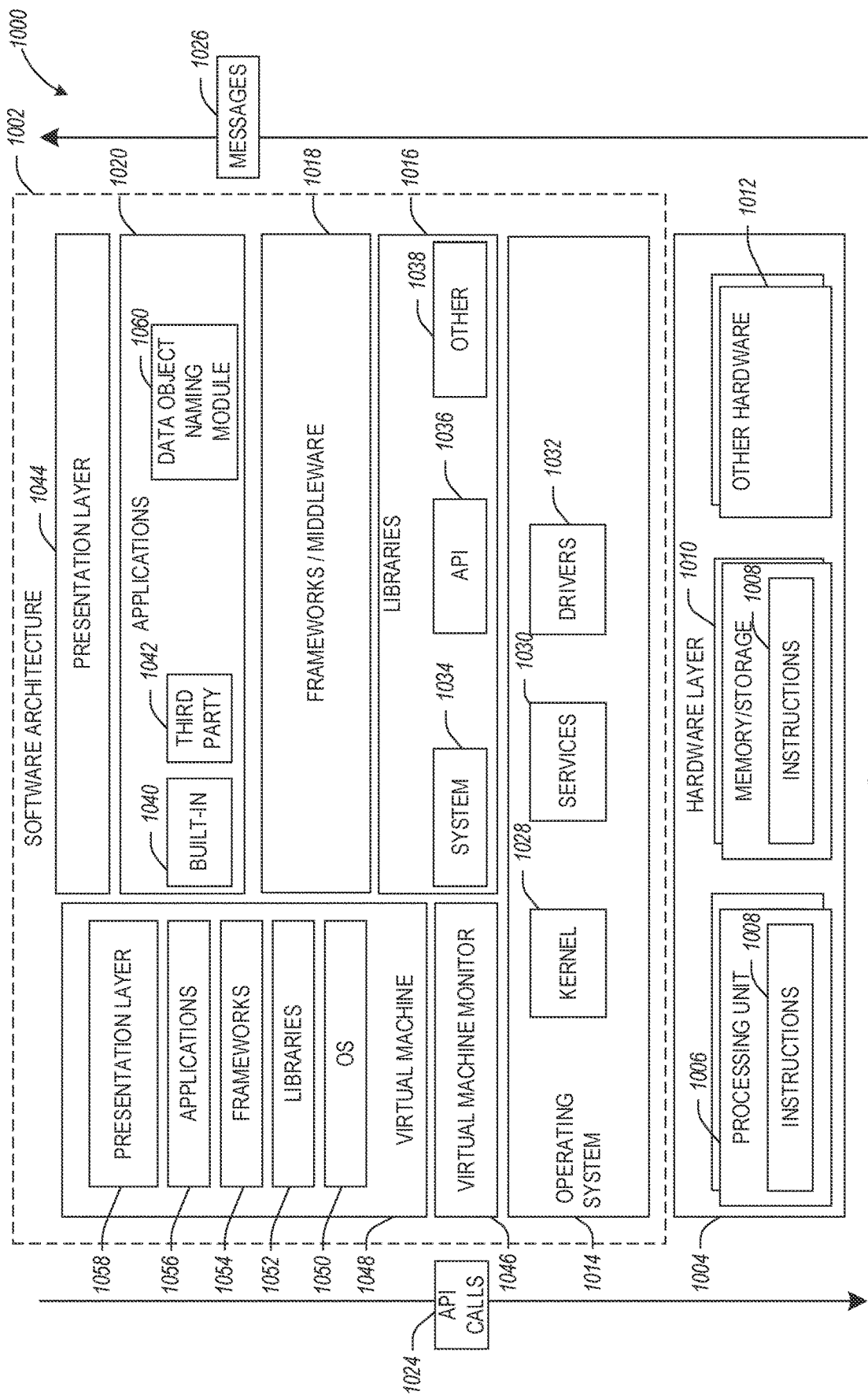
FIG. 10 is a block diagram illustrating a representative software architecture, which may be used in conjunction with various device hardware described herein, according to some example embodiments.

FIG. 10 is a block diagram illustrating a representative software architecture 1000, which may be used in conjunction with various device hardware described herein, according to some example embodiments. FIG. 10 is merely a non-limiting example of a software architecture 1002 and it will be appreciated that many other architectures may be implemented to facilitate the functionality described herein. The software architecture 1002 may be executing on hardware such as device 1100 of FIG. 11 that includes, among other things, processor 1105, memory 1110, storage 1115 and 1120, and I/O components 1125 and 1130. A representative hardware layer 1004 is illustrated and can represent, for example, the device 1100 of FIG. 11. The representative hardware layer 1004 comprises one or more processing units 1006 having associated executable instructions 1008. Executable instructions 1008 represent the executable instructions of the software architecture 1002, including implementation of the methods, modules, and so forth of FIGS. 1-9. Hardware layer 1004 also includes memory and/or storage modules 1010, which also have executable instructions 1008. Hardware layer 1004 may also comprise other hardware 1012, which represents any other hardware of the hardware layer 1004, such as the other hardware illustrated as part of device 1100.

In the example architecture of FIG. 10, the software architecture 1002 may be conceptualized as a stack of layers where each layer provides particular functionality. For example, the software architecture 1002 may include layers such as an operating system 1014, libraries 1016, frameworks/middleware 1018, applications 1020, and presentation layer 1044. Operationally, the applications 1020 and/or other components within the layers may invoke application programming interface (API) calls 1024 through the software stack and receive a response, returned values, and so forth illustrated as messages 1026 in response to the API calls 1024. The layers illustrated in FIG. 10 are representative in nature and not all software architectures 1002 have all layers. For example, some mobile or special purpose operating systems may not provide a framework/middleware 1018, while others may provide such a layer. Other software architectures may include additional or different layers.

The operating system 1014 may manage hardware resources and provide common services. The operating system 1014 may include, for example, a kernel 1028, services 1030, drivers 1032, and natural store modules 1060. The kernel 1028 may act as an abstraction layer between the hardware and the other software layers. For example, kernel 1028 may be responsible for memory management, processor management (e.g., scheduling), component management, networking, security settings, and so on. The services 1030 may provide other common services for the other software layers. The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

In some aspects, the natural store modules 1060 may comprise suitable circuitry, logic, interfaces, and/or code and can be configured to perform one or more of the functions discussed in connection with FIGS. 1-9 and modules 202-216 of NS 124.

Libraries 1016 may provide a common infrastructure that may be utilized by the applications 1020 and/or other components and/or layers. The libraries 1016 typically provide functionality that allows other software modules to perform tasks more easily than to interface directly with the underlying operating system 1014 functionality (e.g, kernel 1028, services 1030, drivers 1032, and/or modules 1060). Libraries 1016 may include system libraries 1034 (e.g., C standard library) that may provide functions such as memory allocation functions, string manipulation functions, mathematic functions, and the like. In addition, libraries 1016 may include API libraries 1036 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. Libraries 1016 may also include a wide variety of other libraries 1038 to provide many other APIs to the applications 1020 and other software components/modules.

The frameworks/middleware 1018 (also sometimes referred to as middleware) may provide a higher-level common infrastructure that may be utilized by the applications 1020 and/or other software components/modules. For example, the frameworks/middleware 1018 may provide various graphical user interface (GUI) functions, high-level resource management, high-level location services, and so forth. The frameworks/middleware 1018 may provide a broad spectrum of other APIs that may be utilized by the applications 1020 and/or other software components/modules, some of which may be specific to a particular operating system 1014 or platform.

The applications 1020 include built-in applications 1040 and/or third-party applications 1042. Examples of representative built-in applications 1040 may include but are not limited to, a contacts application, a browser application, a book reader application, a location application, a media application, a messaging application, and/or a game application. Third-party applications 1042 may include any of the built-in applications 1040 as well as a broad assortment of other applications. In a specific example, the third-party application 1047 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1042 may invoke the API calls 1024 provided by the mobile operating system such as operating system 1014 to facilitate functionality described herein.

The applications 1020 may utilize built-in operating system functions (e.g., kernel 1028, services 1030, drivers 1032, and/or modules 1060), libraries (e.g., system libraries 1034, API libraries 1036, and other libraries 1038), and frameworks/middleware 1018 to create user interfaces to interact with users of the system. Alternatively, or additionally, in some systems, interactions with a user may occur through a presentation layer, such as presentation layer 1044. In these systems, the application/module "logic" can be separated from the aspects of the application/module that interact with a user.

Some software architectures utilize virtual machines. In the example of FIG. 10, this is illustrated by virtual machine 1048. A virtual machine creates a software environment where applications/modules can execute as if they were executing on a hardware machine (such as the device 900 of FIG. 9, for example). A virtual machine 1048 is hosted by a host operating system (operating system 1014 in FIG. 10) and typically, although not always, has a virtual machine monitor 1046, which manages the operation of the virtual machine 1048 as well as the interface with the host operating system (i.e., operating system 1014). A software architecture 1002 executes within the virtual machine 1048 such as an operating system 1050, libraries 1052, frameworks/middleware 1054, applications 1056, and/or presentation layer 1058. These layers of software architecture executing within the virtual machine 1048 can be the same as corresponding layers previously described or may be different.

Figure 11:
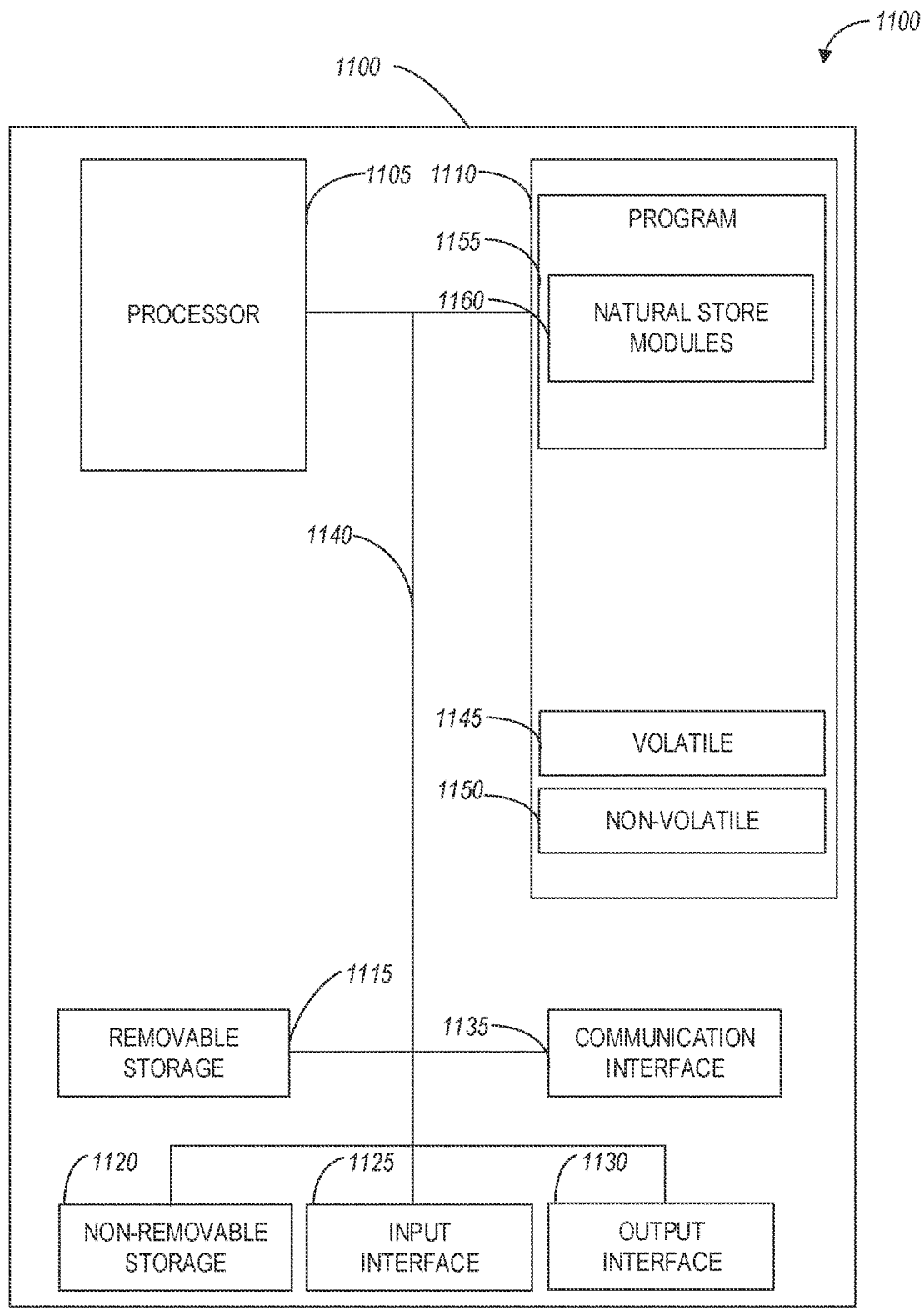
FIG. 11 is a block diagram illustrating circuitry for a device that implements algorithms and performs methods, according to some example embodiments.

FIG. 11 is a block diagram illustrating circuitry for a device that implements algorithms and performs methods, according to some example embodiments. All components need not be used in various embodiments. For example, clients, servers, and cloud-based network devices may each use a different set of components, or in the case of servers, larger storage devices.

One example computing device in the form of a computer 1100 (also referred to as computing device 1100, computer system 1100, or computer 1100) may include a processor 1105, memory storage 1110, removable storage 1115, non-removable storage 1120, an input interface 1125, an output interface 1130, and a communication interface 1135, all connected by a bus 1140. Although the example computing device is illustrated and described as the computer 1100, the computing device may be in different forms in different embodiments.

The memory storage 1110 may include volatile memory 1145 and non-volatile memory 1150 and may store a program 1155. The computer 1100 may include—or have access to a computing environment that includes—a variety of computer-readable media, such as the volatile memory 1145, the non-volatile memory 1150, the removable storage 1115, and the non-removable storage 1120. Computer storage includes random-access memory (RAM), read-only memory (ROM), erasable programmable read-only memory (EPROM) or electrically erasable programmable read-only memory (EEPROM), flash memory or other memory technologies, compact disc read-only memory (CD ROM, digital versatile disks (DVD) or other optical disk storage, magnetic cassettes, magnetic tape, magnetic disk storage or other magnetic storage devices, or any other medium capable of storing computer-readable instructions.

Computer-readable instructions stored on a computer-readable medium (e.g., the program 1155 stored in the memory 1110) are executable by the processor 1105 of the computer 1100. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example. As used herein, the terms "computer-readable medium" and "machine-readable medium" are interchangeable.

Program 1155 may utilize a customer preference structure using modules discussed herein, such as natural store modules 1160. The natural store modules 1160 may be the same as the natural store modules 1060 as discussed in connection with FIG. 10.

Any one or more of the modules described herein may be implemented using hardware (e.g., a processor of a machine, an application-specific integrated circuit (ASIC), field-programmable gate array (FPGA), or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

In some aspects, modules 1160, as well as one or more other modules that are part of the program 1155, can be integrated as a single module, performing the corresponding functions of the integrated modules.

In an example embodiment, the computer 1100 includes a network configuration module retrieving network configuration information identifying a plurality of devices forming the P2P ad hoc network, a time offset module determining a time offset between a local physical time at a first device of the plurality of devices and a local physical time of a second device of the plurality of devices, a data object change module detecting a change in a data object of a plurality of data objects stored at a key-value store within the first device, wherein each of the plurality of data Objects includes a synchronization indicator, a communication module communicating the change in the data object to at least the second device of the plurality of devices within the P2P ad hoc network based on the synchronization indicator, and a network configuration update module upon receiving a confirmation from the second device of receipt of the data object change, updating the network configuration information with a timestamp based on the time offset and indicative of the local physical time at the first device when the data object change is communicated. In some embodiments, the computer 1100 may include other or additional modules for performing any one of or combination of steps described in the embodiments. Further, any of the additional or alternative embodiments or aspects of the method, as shown in any of the figures or recited in any of the claims, are also contemplated to include similar modules.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

It should be further understood that software including one or more computer-executable instructions that facilitate processing and operations as described above concerning any one or all of the steps of the disclosure can be installed in and sold with one or more computing devices consistent with the disclosure. Alternatively, the software can be Obtained and loaded into one or more computing devices, including obtaining the software through a physical medium or distribution system, including, for example, from a server owned by the software creator or from a server not owned but used by the software creator. The software can be stored on a server for distribution over the Internet, for example.

Also, it will be understood by one skilled in the art that this disclosure is not limited in its application to the details of construction and the arrangement of components outlined in the description or illustrated in the drawings. The embodiments herein are capable of other embodiments and capable of being practiced or carried out in various ways. Also, it will be understood that the phraseology and terminology used herein are for description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the is "connected" and "coupled", and variations thereof, are not restricted to physical or mechanical connections or couplings. Further, terms such as up, down, bottom, and top are relative, and are employed to aid illustration, but are not limiting.

The components of the illustrative devices, systems, and methods employed in accordance with the illustrated embodiments can be implemented, at least in part, in digital electronic circuitry, analog electronic circuitry, or computer hardware, firmware, software, or in combinations of them. These components can be implemented, for example, as a computer program product such as a computer program, program code or computer instructions tangibly embodied in an information carrier, or a machine-readable storage device, for execution by, or to control the operation of, data processing apparatus such as a programmable processor, a computer, or multiple computers.

A computer program can be written in any form of programming language, including compiled or interpreted languages, and it can be deployed in any form, including as a stand-alone program or as a module, component, subroutine, or other units suitable for use in a computing environment. A computer program can be deployed to be executed on one computer or multiple computers at one site or distributed across multiple sites and interconnected by a communication network. Also, functional programs, codes, and code segments for accomplishing the techniques described herein can be easily construed as within the scope of the claims by programmers skilled in the art to which the techniques described herein pertain. Method steps associated with the illustrative embodiments can be performed by one or more programmable processors executing a computer program, code, or instructions to perform functions (e.g., by operating on input data and/or generating an output). Method steps can also be performed by, and apparatus for performing the methods can be implemented as, special purpose logic circuitry, e.g., an FPGA (field-programmable gate array) or an A SIC (application-specific integrated circuit), for example.

The various illustrative logical blocks, modules, and circuits described in connection with the embodiments disclosed herein may be implemented or performed with a general-purpose processor, a digital signal processor (DSP), an ASIC, an FPGA or other programmable logic device, discrete gate, or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random-access memory, or both. The required elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD)-ROM disks). The processor and the memory can be supplemented by or incorporated in special purpose logic circuitry.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

As used herein, "machine-readable medium" (or "computer-readable medium") means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store processor instructions. The term "machine-readable medium" shall also be taken to include any medium or a combination of multiple media, that is capable of storing instructions for execution by one or more processors 1105, such that the instructions, when executed by one or more processors 1105, cause the one or more processors 1105 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" as used herein excludes signals per se.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Although the present disclosure has been described with reference to specific features and embodiments thereof, it is evident that various modifications and combinations can be made thereto without departing from the scope of the disclosure. For example, other components may be added to, or removed from, the described systems. The specification and drawings are, accordingly, to be regarded simply as an illustration of the disclosure as defined by the appended claims, and are contemplated to cover any modifications, variations, combinations, or equivalents that fall within the scope of the present disclosure. Other aspects may be within the scope of the following claims.

What is claimed is:

1. A computer-implemented method for data synchronization in a peer-to-peer (P2P) ad hoc network, the method comprising:
    retrieving network configuration information identifying a plurality of devices forming the P2P ad hoc network;
    determining a time offset between a local physical time at a first device of the plurality of devices and a local physical time of a second device of the plurality of devices;
    detecting a change in a data object of a plurality of data objects stored at a key-value store within the first device, each of the plurality of data objects including a synchronization indicator;
    communicating the change in the data object to at least the second device of the plurality of devices within the P2P ad hoc network based on the synchronization indicator; and
    upon receiving a confirmation from the at least the second device of receipt of the data object change, updating the network configuration information with a timestamp based on the time offset and indicative of the local physical time at, the first device when the data object change was communicated.

2. The computer-implemented method of claim 1, wherein the network configuration information comprises device profile information for each device of the plurality of devices forming the P2P ad hoc network, the device profile information comprising:
    a device identification information associated with the device;
    a sending watermark indicative of a timestamp of a last successful communication to the device; and
    an online indicator indicative of whether the device is active within the P2P ad hoc network.

3. The computer-implemented method of claim 2, wherein updating the network configuration information comprises:
    updating the sending watermark within the device profile information for the at least the second device with the timestamp indicative of the local physical time at the first device when the change in the data object is communicated to the at least the second device.

4. The computer-implemented method of claim 1, wherein the timestamp comprises the local physical time at the first device when the change in the data object was communicated, with the local physical time being adjusted by the time offset.

5. The computer-implemented method of claim 1, wherein each data object of the plurality of data objects further includes:
    a key-value pair;
    a timestamp indicative of a time the data object was created; and
    a deletion flag indicating whether the data object is to be deleted.

6. The computer-implemented method of claim 5, wherein the key-value pair for each of the plurality of data objects stored in the key-value store comprises application data associated with an application executing on the first device.

7. The computer-implemented method of claim 5, further comprising:
    receiving an updated version of the data object from a third device of the plurality of devices, the updated version of the data object including a timestamp of a local physical time at the third device when the updated version of the data object is communicated.

8. The computer-implemented method of claim 7, further comprising:
    replacing the data object with the updated version of the data object when the timestamp indicative of the time the data object was created is smaller than the timestamp received with the updated version.

9. The computer-implemented method of claim 7, further comprising:
    discarding the received updated version of the data object when the timestamp indicative of the time the data object was created is greater than the timestamp received with the updated version.

10. A data synchronization system comprising:
    a memory that stores instructions; and
    one or more processors in communication with the memory, wherein the one or more processors execute the instructions to:
        retrieve network configuration information identifying a plurality of devices forming a peer-to-peer (P2P) ad hoc network;
        determine a time offset between a local physical time at a first device of the plurality of devices and a local physical time of a second device of the plurality of devices;
        detect a change in a data object of a plurality of data objects stored at a key-value store within the first device, each of the plurality of data objects including a synchronization indicator;
        communicate the change in the data object to at least the second device of the plurality of devices within the P2P ad hoc network based on the synchronization indicator; and
        upon receiving a confirmation from the at least the second device of receipt of the change in the data object, update the network configuration information with a timestamp, the timestamp based on the time offset and indicative of the local physical time at the first device when the change in the data object was communicated.

11. The system of claim 10, wherein the network configuration information comprises device profile information for each device of the plurality of devices forming the P2P ad hoc network, the device profile information comprising:
    a device identification information associated with the device;
    a sending watermark indicative of a timestamp of a last successful communication to the device; and
    an online indicator indicative of whether the device is active within the P2P ad hoc network.

12. The system of claim 11, wherein to update the network configuration information, the one or more processors execute the instructions to:
    update the sending watermark within the device profile information for the at least the second device with the timestamp indicative of the local physical time at the first device when the change in the data object is communicated to at least the second device.

13. The system of claim 10, wherein the timestamp comprises the local physical time at the first device when the data object change was communicated, with the local physical time being adjusted by the time offset.

14. The system of claim 10, wherein each data object of the plurality of data objects further includes:
a key-value pair;
a timestamp indicative of a time the data object was created; and
a deletion flag indicating whether the data object is to be deleted.

15. The system of claim 14, wherein the key-value pair for each of the plurality of data objects stored in the key-value store comprises application data associated with an application executing on the first device.

16. The system of claim 14, wherein the one or more processors execute the instructions to:
receive an updated version of the data object from a third device of the plurality of devices, the updated version of the data object including a timestamp of local physical time at the third device when the updated version of the data object is communicated.

17. The system of claim 16, wherein the one or more processors execute the instructions to:
replace the data object with the updated version of the data object when the timestamp indicative of the time the data object was created is smaller than the timestamp received with the updated version.

18. A non-transitory computer-readable medium storing computer instructions for data synchronization in a peer-to-peer (P2P) ad hoc network, wherein the instructions, when executed by one or more processors, cause the one or more processors to perform instructions comprising:
retrieving network configuration information identifying a plurality of devices forming the P2P ad hoc network;
determining a time offset between a local physical time at a first device of the plurality of devices and a local physical time of a second device of the plurality of devices;
detecting a change in a data object of a plurality of data objects stored at a key-value store within the first device, each of the plurality of data objects including a synchronization indicator;
communicating the change in the data object to at least the second device of the plurality of devices within the P2P ad hoc network based on the synchronization indicator; and
upon receiving a confirmation from the at least the second device of receipt of the change in the data object, updating the network configuration information with a timestamp, the timestamp based on the time offset and indicative of the local physical time at the first device when the data object change was communicated.

19. The non-transitory computer-readable medium of claim 18, wherein to determine the time offset, the instructions further cause the one or more processors to perform instructions comprising:
communicating a synchronization request from the first device to the second device at a time associated with a first timestamp of the first device;
receiving at a second timestamp of the first device, a synchronization response from the second device, the synchronization response including a first timestamp of the second device and a second timestamp of the second device indicative of local time the second device received the synchronization request and sent the synchronization response, respectively; and
determining the time offset based on the first and second timestamps of the first device and the first and second timestamps of the second device.

20. The non-transitory computer-readable medium of claim 19, wherein the instructions further cause the one or more processors to perform instructions comprising:
receiving an updated version of the data object from at least a third device of the plurality of devices, the updated version of the data object including a timestamp of a local physical time at the at least third device when the updated version of the data object is communicated; and
performing one of:
replacing the data object with the updated version of the data object when a timestamp indicative of the time the data object was created at the first device is smaller than the timestamp received with the updated version; and
discarding the received updated version of the data object when the timestamp indicative of the time the data object was created at the first device is greater than the timestamp received with the updated version.

* * * * *

UNITED STATES PATENT AND TRADEMARK OFFICE
CERTIFICATE OF CORRECTION

PATENT NO. : 11,438,133 B2
APPLICATION NO. : 17/446779
DATED : September 6, 2022
INVENTOR(S) : Chen et al.

It is certified that error appears in the above-identified patent and that said Letters Patent is hereby corrected as shown below:

In the Claims

In Column 21, Line 35, in Claim 1, delete "at," and insert --at-- therefor

Signed and Sealed this
Twentieth Day of December, 2022

Katherine Kelly Vidal
*Director of the United States Patent and Trademark Office*